March 26, 1963   A. KHAWAM ETAL   3,082,486
METHOD OF MOLDING A REINFORCED FOAM ARTICLE
Filed March 25, 1959

INVENTORS
*Antoine Khawam*
*Max Koenigsberg*

BY
*Diggins & Le Blanc*
ATTORNEYS 3,082,486
METHOD OF MOLDING A REINFORCED FOAM ARTICLE
Antoine Khawam, 4809 Westland Blvd., Baltimore 27, Md., and Max Koenigsberg, 1281 Crofton Park, Highland Park, Ill.
Filed Mar. 25, 1959, Ser. No. 801,815
7 Claims. (Cl. 18—59)

This invention relates to a molding process and more particularly is concerned with reducing air pockets in molded flexible foam articles such as polyurethane mattresses, cushions and the like.

As is well known, extreme difficulty has heretofore been experienced in molding flexible foams and particularly polyurethane foams in a completely closed mold. However, because of the relatively simple and inexpensive features of a closed molding process in making flexible foam products in addition to the advantages it offers in terms of elimination of waste scrap and in handling, the closed mold process would be highly desirable if the difficulties could be obviated.

The difficulties encountered with flexible foams using a closed mold can be largely attributed to pressure and pressure distribution inside the mold. When a certain quantity of foaming mass is poured into a mold, pressure is generated inside the mold as the foam rises to its maximum height and hits the mold lid or cover. The result is an uneven distribution of pressure inside the mold with the creation of areas of higher pressure than other adjacent areas. This action occurs before the foaming mass has set to its final, solid state, and while it is sticky, viscous and still in the semi-liquid, semi-solid state.

The only known way of avoiding the above-described uneven distribution of pressure throughout the foaming mass is to calculate the amount of material required to fill the mold to the nearest ounce with the greatest possible accuracy. However, the necessity for very accurately metering and distributing the foam for a material such as a mattress, for example, weighing approximately 25 lbs. renders the production of these articles extremely difficult and the percentage of rejects is so high as to make the process completely impractical.

The present invention provides a novel process and product wherein the above-mentioned difficulties are avoided by equalizing the pressures within the mold, preferably incorporating a mesh or net of woven material in the mold during the molding process. As a result, irregularities in the foam articles, such as globules, collapsed foam and hard spots, particularly adjacent the upper and lower skin surfaces of a product such as a mattress or cushion, are substantially eliminated. Those irregularities that do occur are not only substantially reduced in size and number but are controlled in such a way as to restrict their occurrence to the center area of the foam article, so that the surface areas of the article remain unmarred and present a uniform skin layer.

It is therefore a primary object of the present invention to provide an improved process for molding flexible foam articles.

Still another object of the present invention is to provide an improved process for producing polyurethane foam articles in a closed mold.

These and other objects and advantages of the invention will be more apparent upon reference to the following specification and claims and appended drawings wherein:

It has been found that the influence of pressure and uneven pressure distribution on a foam mass during the semi-liquid, semi-solid state produces a final article in which layers of foam are totally displaced from zones of high pressure to zones of lower pressure. This results in blow-holes, collapsed foam and hard spots throughout the article. Furthermore, a major portion of these defects invariably occurs at the bottom of the mold adjacent the lower skin surface in such a position as to make the entire article defective and unacceptable.

It is believed that the reasons these defects occur primarily at the bottom of the mold near the skin is that this is the area where the semi-liquid, semi-solid foaming mass is most liquid and most elastic. When the foam is first poured into the mold and during the earlier stages of the reaction, the entire mass acts as a free flowing liquid. Seconds later the mass starts to rise and gel. In so doing, the more solid or semi-solid portions of the foam rise away from the liquid remaining at the bottom of the mold so that any uneven pressure distribution within the mold produces a flow of the less viscous foam layers near the mold bottom.

The present invention utilizes in the preferred embodiment an intermediate layer of mesh or net material to not only substantially reduce the size and number of defects in the molded article but also to displace these defects toward the center where they are not objectionable and may be used to advantage.

Figure 1:
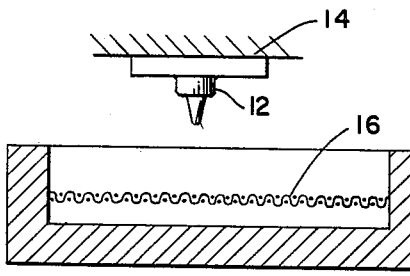
FIGURE 1 shows a mold and foam distributing nozzle constructed in accordance with the present invention.

Referring to the drawings, FIGURE 1 shows the lower half of a mold 10 in cross-section with a conventional foam distributing nozzle 12 suitably supported above the open top of the mold as indicated at 14. Nozzles of this type adapted to move over the mold to distribute flexible foam such as polyurethane foam and a suitable activator are well-known and no further description is deemed necessary.

Figure 1A:
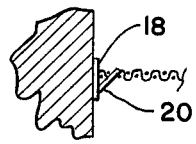
FIGURE 1a shows in detail an arrangement for supporting a net or mesh in the mold of FIGURE 1.
Figure 2:
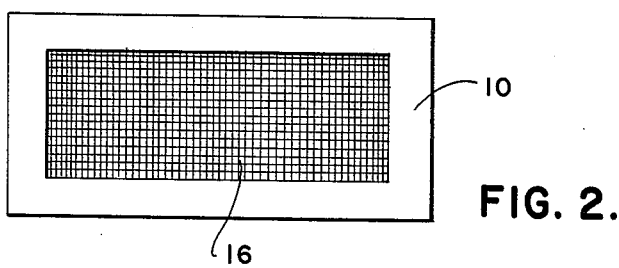
FIGURE 2 is a plan view of the mold of FIGURE 1 showing a net or mesh extending across the mold.
Figure 3:
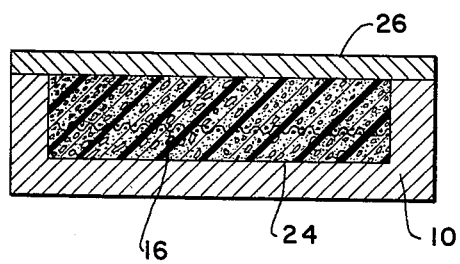
FIGURE 3 shows the mold of FIGURE 1 filled with flexible foam material and closed by a mold lid.

Firmly suspended approximately one-third of the way up from the bottom of the mold 10 is a net 16 as more clearly seen in FIGURE 2. Net 16 may be suspended by any suitable means within the mold and by way of example only, FIGURE 1a shows one of a plurality of small horizontally spaced brackets 18 each including an upwardly extending arm or hook 20 for engaging the edge interstices of the net 16. Each of the brackets 18 may be secured to the mold wall by any suitable means such as screws, bolts or adhesive. Alternatively the mold may be provided with apertures and wire hooks extending through the apertures supported from outside the mold. The brackets 18 are preferably constructed of metal and removed from the final molded article, but may be constructed of suitable plastic and permanently retained to form a integral part of the molded article. Approximately six or eight of these small clips spaced about the inner surface of lower mold section 10 serve to firmly retain the net 16 in proper position within the mold.

In forming a molded article such as a mattress or cushion in accordance with the present invention, the net 16 is placed at any desired position adjacent the center of the mold as shown in FIGURE 1. The particular location of the net is not critical, the only requirement being that it be substantially spaced from both the top and bottom surface of the mold. On the other hand, the mesh spacing of the net is important and should be selected in accordance with the viscosity of the particular resins used. As an example, with the commercial polyether foams nets having a ¼ inch spacing between adjacent strands has been found particularly satisfactory. However, this optimum spacing varies widely with the particular foams used and in general higher viscosity foams require more open nets with larger spacing between strands. The net 16 is preferably made of suitable fabric such as cotton, hemp or the like for economy but may be constructed of wire if desired.

With the net placed in the mold and held firmly in place the liquid foaming mass is poured into the mold and over the net in the conventional manner. While the invention is described in conjunction with the use of a polyether-urethane prepolymer, it will be understood that it is not so limited and that any of the commercially available moldable, flexible foam materials may be utilized. For example, the invention may be practiced in conjunction with other polyurethane flexible systems such as polyether using the one-shot method, the dimer acid based polyesters, as well as the standard classical polyesters, using a one-shot, quasi pre-polymer or total pre-polymer mixture.

The commercially available pre-polymer resins are made by the reaction of a polyether glycol, such as polypropylene glycol, having a molecular weight of approximately 2,000 and ether modified with water up to 0.4% and another more costly polyether glycol in some cases, or completely unmodified in other cases. The modification and the degree of cross-linking determine the softness or hardness of the foam obtained from the resin. The glycol is normally reacted under rigidly controlled conditions with an excess of tolylene di-isocyanate to give a free or unreacted isocyante content of from 7 to 11% with 9 to 11% the preferred range for a low density foam suitable for use in comfort cushioning applications. The resin prepared in this way is reacted with water and an activator mixture conventionally composed of morpholine and tertiary amines using a silicone emulsifier. Formulations of this type are well known and further description is deemed unnecessary.

As an example, a commercially available foam machine was used with the pre-polymers made from polyether and di-isocyante compounded with silicone as one component and the amine water activator mixture as the other component. The two components were accurately metered into a mixing head revolving at high speed and the foaming mass disbursed into an aluminum mold where a ¼″ size burlap net was held firmly at one-third the distance from the bottom of the mold. After the foam mass had been poured from the mixing head into the mold, the lid was applied and the mold cured for a few minutes at 200% F. The molded foam was then stripped from the mold and treated in the usual way. Foam articles produced in this manner were found to be practically free of defects while foams made without the net 16 possessed considerable irregularities and defects.

Figure 4:
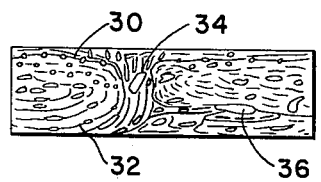
FIGURE 4 is a representation of the imperfections found in flexible foam articles produced by conventional closed mold methods.

FIGURE 4 represents a cross-section through a molded article formed without a net and with the cross-hatching omitted for the sake of clarity. As can be seen, an almost continuous series of irregularities as indicated at 30 and 32 extend along both the upper and lower surface of the article. Furthermore, as indicated at 34, large irregularities extended almost entirely through the mold and in such a case are clearly visible from the top of the article rendering it completely unsuitable for use. A very substantial irregularity or blow-hole of several inches in diameter is indicated at 36.

Figure 5:
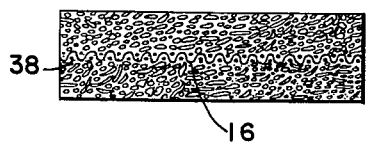
FIGURE 5 is a representation showing the substantially reduced and controlled imperfections found in a foam article produced according to the present invention.

FIGURE 5 represents a similar cross section through a typical article formed in the manner of the present invention and incorporating an intermediate net layer 16. As can be seen in FIGURE 5, the resulting article exhibits only minor irregularities indicated at 38 which are limited to the area of the article closely adjacent net 16.

The incorporation of an intermediate net layer between the upper and lower skin surfaces of the molded article offers several advantages over conventional products. When the liquid foaming mass is poured into the mold, it is to a great extent filtered through the net, with part of the foam remaining on the net and part sieved through the net to the bottom of the mold so that the foam rises under two layers with the weakest layer being displaced from the bottom of the mold as in the conventional case to the plane of the net. Therefore, when a pressure differential occurs, this differential causes a localized flow of layers on the surface of the net and by controlling the position of the net, the irregularities in cell structure can be controlled and shifted to the center of the article. In addition, by simply providing cells and units for the foam to adhere to and remain in place, the effect of the pressure differentials in producing irregularities is substantially reduced.

An additional important feature of the present invention is that by controlling the position of the irregularities, the irregularities can be made to serve a useful purpose. As is well known, mattresses, comfort cushions and the like take in and exhaust air during use in a manner often called "breathing." Many of the foam materials, and particularly polyether foams, tend to be of closed cells, so that when a weight is applied to the foam, air tends to escape only slightly and when weight is removed, this air is sucked back into the foam only with some difficulty. The presence of the desirable uniform skin surfaces on the molded foams accentuates the difficult "breathing" qualities of this type of material. As a result, piercing and crushing is often utilized to break the cells and cause aeration. In addition, it is known to insert hollow cylinders in the sides of a mattress to provide space for breathing. This is done by the insertion of rods in the mold during molding.

By controlling the position of the irregularities in the manner described, it is possible to position the coarse and larger cells toward the center of the molded objects around the net, resulting in a uniform plane of larger cells and irregularities along which the foam can breathe.

It is apparent that the present invention provides a novel process wherein irregularities conventionally exhibited by flexible foams formed in closed molds are substantially reduced and controlled to provide a superior product. The method of the present invention is simple and economical and permits the advantages resulting from the closed mold-type method of producing flexible foam to be fully realized. The need for very accurately metering foam charges is completely eliminated and the waste resulting from conventional methods is substantially reduced. The foam articles exhibit improved comfort cushioning qualities and are provided with a uniform layer of large cells and minor irregularities which substantially reduces the difficulty with which foams of this type may take in and exhaust air.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of molding flexible foam articles comprising positioning a net intermediate the top and bottom of a mold, introducing a flexible foam producing substance into said mold to foam about said net, closing said mold, foaming said flexible foam producing substance about said net, and curing said foam whereby said net becomes an integral part of the molded article.

2. A method of molding flexible foam articles comprising placing a net parallel to and spaced from the top and bottom surfaces of a closed mold, foaming a flexible foam producing substance about said net, and curing said foam in said mold.

3. A method of molding flexible foam articles comprising supporting a net across the lower section of a split mold spaced from the bottom of said mold, distributing a foam producing substance over said net whereby a portion thereof passes through said net to the bottom of said mold, applying the upper section of said mold to said lower section to close said mold, foaming said flexible foam producing substance about said net, and curing the foam produced by said substance.

4. A method of molding flexible foam articles comprising positioning a net across a mold, securing said net to the side walls of said mold intermediate the top and bottom edges of said side walls, introducing a flexible foam producing substance into said mold, closing said mold, foaming said flexible foam producing substance about said net, and curing the foam produced by said substance.

5. A method according to claim 4 wherein said net is spaced from the bottom of said mold approximately ⅓ of the distance from the bottom to the top of said mold.

6. A method according to claim 4 wherein said substance produces flexible polyurethane foam.

7. A method according to claim 6 wherein said net is made of fabric material with an adjacent strand spacing of approximately ¼ inches.

References Cited in the file of this patent

UNITED STATES PATENTS

| | | |
|---|---|---|
| 721,462 | Richards | Feb. 24, 1903 |
| 1,906,028 | Weber et al. | Apr. 25, 1933 |
| 2,406,589 | Cunningham | Aug. 27, 1946 |
| 2,780,090 | Rasmussen | Feb. 5, 1957 |
| 2,806,812 | Merz | Sept. 17, 1957 |
| 2,858,572 | Burdick | Nov. 4, 1958 |
| 2,948,947 | Berg et al. | Aug. 16, 1960 |